(12) United States Patent
Steinbock

(10) Patent No.: US 6,199,453 B1
(45) Date of Patent: Mar. 13, 2001

(54) HIGH TEMPERATURE BOLTING SYSTEM

(75) Inventor: Rolf H. Steinbock, Carnegie, PA (US)

(73) Assignee: Steinbock Machinery Co., Carnegie, PA (US)

( * ) Notice: Subject to any disclaimer, the term of this patent is extended or adjusted under 35 U.S.C. 154(b) by 0 days.

(21) Appl. No.: 09/067,587

(22) Filed: Apr. 28, 1998

(51) Int. Cl.[7] .............................. B25B 29/02; F16B 35/00; B23P 11/00
(52) U.S. Cl. ........................... 81/57.38; 29/452; 411/14.5; 411/916
(58) Field of Search ................................ 29/452, 525.02, 29/525.11, 256; 81/57.38; 254/29 A; 411/411, 424, DIG. 2, 916, 14.5

(56) References Cited

U.S. PATENT DOCUMENTS

| | | |
|---|---|---|
| Re. 33,490 | 12/1990 | Steinbock . |
| 2,571,265 | * 10/1951 | Leufven ................................. 29/452 |
| 3,154,006 | * 10/1964 | Novak ................................. 254/29 A |
| 3,749,362 | * 7/1973 | O'Connor et al. .................. 254/29 A |
| 3,835,523 | * 9/1974 | Stansfield ............................ 29/452 |
| 4,815,344 | * 3/1989 | Nemec et al. ....................... 81/57.38 |
| 4,846,614 | 7/1989 | Steinbock . |
| 5,339,512 | * 8/1994 | Odsberg et al. ....................... 29/452 |
| 5,742,991 | * 4/1998 | Kurth ................................. 29/452 |
| 5,842,263 | * 12/1998 | Gosling ............................... 29/452 |
| 5,927,157 | * 7/1999 | Gosling .............................. 81/57.38 |

* cited by examiner

Primary Examiner—S. Thomas Hughes
(74) Attorney, Agent, or Firm—Clifford A. Poff

(57) ABSTRACT

A high temperature bolting system for clamping steam turbine housings and similar high temperature parts together while operating at a temperature of 800° F. to 1200° F. An elongated fastener shank and housing material have similar coefficient of thermal expansion. The shank has a tensile strength several times greater than the housing to maintain a clamping force during thermal excursions. The diameter of the shank is reduced due to the large creep strength difference between the elongated fastener shank and the clamped parts. The reduced shank diameter allows an increased in the clamping load by providing an increased surface area in the clamped part. A stress generating flange is provided with jackbolts to establish the clamping load at room temperature. A threaded sleeve is interposed between the threads at the end of the shank and the threads of the housing so that the housing threads have a sufficiently large area for withstanding the clamping load. A truncated conical internal wall in the shank in combination with a differential thread pitch in an embodiment provides higher resistance to the clamping force. A flanged support ring is mounted at a bolt hole in the flange to support a load bearing area when retrofitting existing housings.

22 Claims, 5 Drawing Sheets

HIGH TEMPERATURE BOLTING SYSTEM

BACKGROUND OF THE INVENTION

1. Field of the Invention

The present invention relates to a bolting system for maintaining a clamping force between bolted parts while operating at a temperature of 800° F. to 1200° F. and more particularly to a fastener construction providing a coefficient of thermal expansion similar to the coefficient of thermal expansion of the bolted parts for minimizing differential dimension changes due to temperature variations and providing a shank portion of the fastener with an elastic limit sufficiently great to maintain a clamping force between the bolted parts throughout a temperature range from ambient to the operating temperature.

2. Description of the Prior Art

The present invention is addressed to solving complex problems involving bolting systems required to operate at high temperatures for an extended operating time. Conventional bolting systems used to form high temperature joints, used particularly in steam turbines and similar joints, have the acute disadvantage that they become considerably weaker when the operating temperature increases. It is necessary in such a bolting system that components are designed to clamp the joint firmly without damaging the most expensive part, the main turbine casting. In some cases the clamped part may be an expensive valve body or any other component. While the present invention is not so limited, a bolting system for a main steam turbine casing has been chosen for the purpose of disclosing the present invention.

At elevated temperatures of the order of 800° F. to 1200° F., bolting parts, typically studs tensioned in a threaded tapped hole, often fail because of an improper selection of stud material. The studs soften, stretch and become loose. Other problems occur because the stud is subjected to differential expansion causing the clamped part to become loose when the stud expands faster than the clamped part and similarly the stud becomes over stressed when stud expansion is slower than the clamped part. In the latter circumstance conventional studs stretch permanently under the clamping force because the force is too great.

By way of a detailed example of such bolting problems, is the bolting of the split casing of a steam turbine. The casing in the area around the steam inlet reaches a temperature typically of 1000° F. to 1050° F. The turbine casing is usually heavy with wall thickness ranging from two to eight inches thick formed by casting a chrome molybdenum vanadium steel. This cast steel is relatively strong at 1000° F. compared to other low cost casting materials. Relatively strong means it will soften at 1000° F. to less than 10,000 psi creep strength while other low cost castings soften to 2,000–5,000 psi creep strength at 1000° F. Most casting materials start at about 40,000 psi to 60,000 psi yield strength when cold. Steam turbines have to withstand not only high temperatures, but also high pressures. The high temperatures, high pressures and relatively soft materials demand that the castings are made with very thick walls. The larger the turbine the thicker the wall.

Since a turbine housing is split along its axis, the two halves have to be bolted together. On large turbines the bolts may be as large as 6 inches in diameter. On small turbines the bolts may be 2 inches in diameter. In many cases the bolts are made from a material similar to the material of the housing, which in turn allows both, bolt as well as housing, to expand at the same rate as the temperature rises. This has been the practice for many years when the chrome molybdenum vanadium steel casting was bolted together with chrome molybdenum vanadium steel bolts. By design the combined cross section of the chrome molybdenum vanadium steel bolts is smaller than the cross section of the cast housing. After a certain time the bolts relax to a point where they do not clamp the two castings sufficiently causing the turbine to leak steam. Turbine designers try to estimate the time it takes for the bolts to relax sufficiently to cause leaks. A five year period was usually considered the time span before leaks occurred and corresponds to scheduled turbine overhaul. However, the estimated time period was not always accurate. Presently, operators prefer to extend the time between overhauls and also raise the operating temperature by up to 50° F. to improve efficiency.

To solve the above problems turbine designers and operators attempted to improve performance by using substitute bolting materials. Some improved performance was obtained by the addition of trace elements such as boron to the basic chrome molybdenum vanadium steel, but the improvements obtained were not sufficient. Many substitute materials were strong enough to operate at the required high temperatures but the expansion coefficient of the bolting material did not match that of the steel casting material. Many heat resistant stainless steels expand at a rapid rate causing a reduction and in extreme circumstances an actual loss of the clamping force provided by the tightening process when reaching the operating temperature of the turbine. The following example demonstrates the problem encountered due to differential expansion at high temperature between bolting material and the turbine casting:

Example:

| | |
|---|---|
| Coefficient of thermal expansion (turbine housing) | $7.9 \times 10^{-6}$ Inch/° F./Inch |
| Thickness of housing flange | 10 inches |
| Operating temperature - Room temperature | $1000 - 70 = 930°$ F. |
| Expansion of flange: | $7.9 \times 10^{-6} \times 10 \times 930 = 0.073$ inches |
| Coefficient of expansion (high temp. bolt A286) | $9.8 \times 10^{-6}$ Inch/° F./Inch |
| Expansion of bolt | $9.8 \times 10^{-6} \times 10 \times 930 = 0.091$ inches |
| Difference in expansion | $0.091 - 0.073 = 0.018$ inches |

This example demonstrates that the expansion of the bolt exceeds the expansion of the flange by 0.018 inches. Tensioning the bolt to create a preload will not resolve the problem. Expansion of the bolt, because of the preload, at room temperature produces an elongation according to Hook's Law:

| | |
|---|---|
| bolt length | 10 inches |
| bolt stress | 45,000 psi |
| modulus of elasticity | $30 \times 10^6$ psi |
| expansion of bolt | $\Delta 1 = 10 \times 45,000/30 \times 10^6 = 0.015$ inches |

The bolt was stretched 0.015 inches by the tension causing the preload but the bolt expanded 0.018 inches due to thermal expansion from 70° F. to 1000° F. Thus the bolt is now loose by 0.003 inches which is obviously not a workable solution.

Another bolting material was found to be unsuitable and that is a martensitic stainless steel of the 400 series. The addition of vanadium to the basic alloy creates an alloy with about twice the strength at high temperatures as compared with the chrome molybdenum vanadium bolting material.

The improved 400 series stainless steel has AISI designation of 422 and is known in the industry as "12% chrome steel". This chrome steel used as a bolting material in Example 1, having a thermal expansion coefficient of $6.4\times10^{-6}$, results in the expansion of the 10 inches bolt by $6.4\times10^{-6}\times10\times930=0.059$ inches. The expansion of the flanges of the housing is 0.073 inches and therefore the bolt must stretch 0.014 inches in excess of the 0.015 inches resulting from the tightening procedure. The total stretch is now 0.015 inches+0.014 inches=0.029 inches. Using Hook's law the tension in the bolt would now be:

$$0.029\times30\times10^6/10=87,000 \text{ psi}$$

The stress increased by a factor of about 2. In reality Hook's law does not apply when materials are stressed above their elastic limits. The 12% chrome material is much too soft at 1000° F. to sustain the 87,000 psi stress. Under these operating conditions the 12% bolting material can sustain only about 18,000 psi of stress over long periods (10,000 hours or more). When over-stressed, the bolt will stretch permanently and therefore loose the tension producing the preload. Another problem arises when the joint of the housing cools down. The casting will shrink faster than the bolt (caused by the different coefficients of expansion) and the bolt will become loose. It will have to be re-tightened before the turbine can be started up again. During the following operation of the turbine the high temperature will stretch the bolt again. Soon the bolt has stretched to such an extent that the threads no longer fit the threads of the nut and a replacement is necessary. Another problem with 12% chrome steel is that the material becomes brittle and cracks during the use. A failure of more than one bolt can lead to catastrophic consequences of the steam turbine.

A nickel super alloy such as Inconel 718 has the desired properties for bolting materials required to operate at temperatures of 1000°–1050° F. but a completely new approach to the bolted joint design is needed to successfully operate in the high temperature and high pressure environment in the operating steam turbine. Nickel super alloys will not significantly soften at high temperatures and these materials are approximately 10 times stronger at 1000° F. than the chrome molybdenum vanadium steel and approximately 5 times stronger than the 12% chrome steel. The super alloy has a coefficient of thermal expansion closely matching the coefficient of thermal expansion of the turbine housing casting.

Because of the strength of the material, the design of the fastener must address a whole new set of problems. One particular problem is the method of tightening the fastener to provide the desired clamping force at both ambient and operating temperatures. Thermal tightening is not reliable and large preloads are difficult to obtain. Studs in turbine casings are spaced very closely and hydraulic tensioners cannot be used due to insufficient space and for the same reason hydraulic wrenches are not suitable. Another serious problem when using super alloys is that the extremely strong bolts can now deform the turbine casting. Assume that a turbine is heated to 1000° F. and the bolt was tightened to 45,000 psi. Due to the same expansion coefficient of the bolt and housing the clamping force does not change. The bolt is strong, it has a creep strength of 100,000 psi even at 1000° F., but at 1000° F. now the housing has a creep strength of less than 10,000 psi. Something has to give, in this case it is the housing. The 100,000 psi bolt can easily deform the 10,000 psi housing causing serious damage.

It is an object of the present invention to provide a bolting system that will maintain a predetermined clamping force while in use at elevated temperatures in the range of 800° F. to 1200° F. and more particularly at a typical temperature of 1000° F. over a long time period without damage to the bolted parts.

It is a further object of the present invention to provide a fastener having a stress releaving threaded joint with the material of the bolted part for transferring stress from the fastener to the relatively low strength material of the bolted part without damage to the threaded connection in operating conditions of extreme thermal excursions.

It is another object of the present invention to provide a fastener system featuring a large load bearing support for a bolted part transverse to the path of stress in the fastener to avoid upsetting the material of the bolted part in operating conditions of extreme thermal excursions.

SUMMARY OF THE PRESENT INVENTION

According to the present invention there is provided a bolting apparatus for maintaining a clamping force between bolted parts while operating at a temperature of 800° F. to 1200° F., the apparatus including the combination of an elongated fastener shank having a coefficient of thermal expansion similar to a coefficient of thermal expansion of such bolted parts for minimizing differential dimensional changes due to temperature variations, the elongated shank having an elastic limit sufficiently great to maintain a clamping force between such bolted parts throughout a temperature range from ambient temperature to an operating temperature of between 800 degrees F. to 1200 degrees F., the fastener shank having a creep strength several times greater than the creep strength of such bolted parts at the operating temperature; a connector at one end of the elongated fastener shank for mechanically joining with one of such bolted parts, a stress generating flange connected to an end portion of the elongated fastener shank which is opposite the end having the connector for tensioning the elongated fastener shank, and a load transfer member for transferring the tension from the stress generating flange to impose a clamping force on one of such bolted parts.

According to a further aspect of the present invention there is provided a method for maintaining a clamping force between bolted parts while operating at a temperature of 800° F. to 1200° F., the method including the steps of selecting an elongated fastener having a stress generator and a connector at opposite ends of a shank portion, the shank portion having a coefficient of thermal expansion similar to the coefficient of thermal expansion of such bolted parts to minimizing differential dimensional changes due to temperature variations, the selected shank having an elastic limit sufficiently great for maintaining a clamping force between such bolted parts throughout a temperature range from ambient temperature to an operating temperature of between 800 degrees F. to 1200 degrees F., the selected fastener shank having a creep strength several times greater than the creep strength of such bolted parts at the operating temperature; installing the selected fastener to mechanically join such bolted parts, and operating the stress generator substantially at an ambient temperature to stress the shank part sufficiently within elastic limits thereof to maintain a clamping force at the operating temperature of between 800 degrees F. to 1200 degrees F.

BRIEF DESCRIPTION OF THE DRAWINGS

These features and advantages will be better understood when read in light of the accompanying drawings in which.

DETAILED DESCRIPTION OF THE PREFERRED EMBODIMENTS

Figure 1:
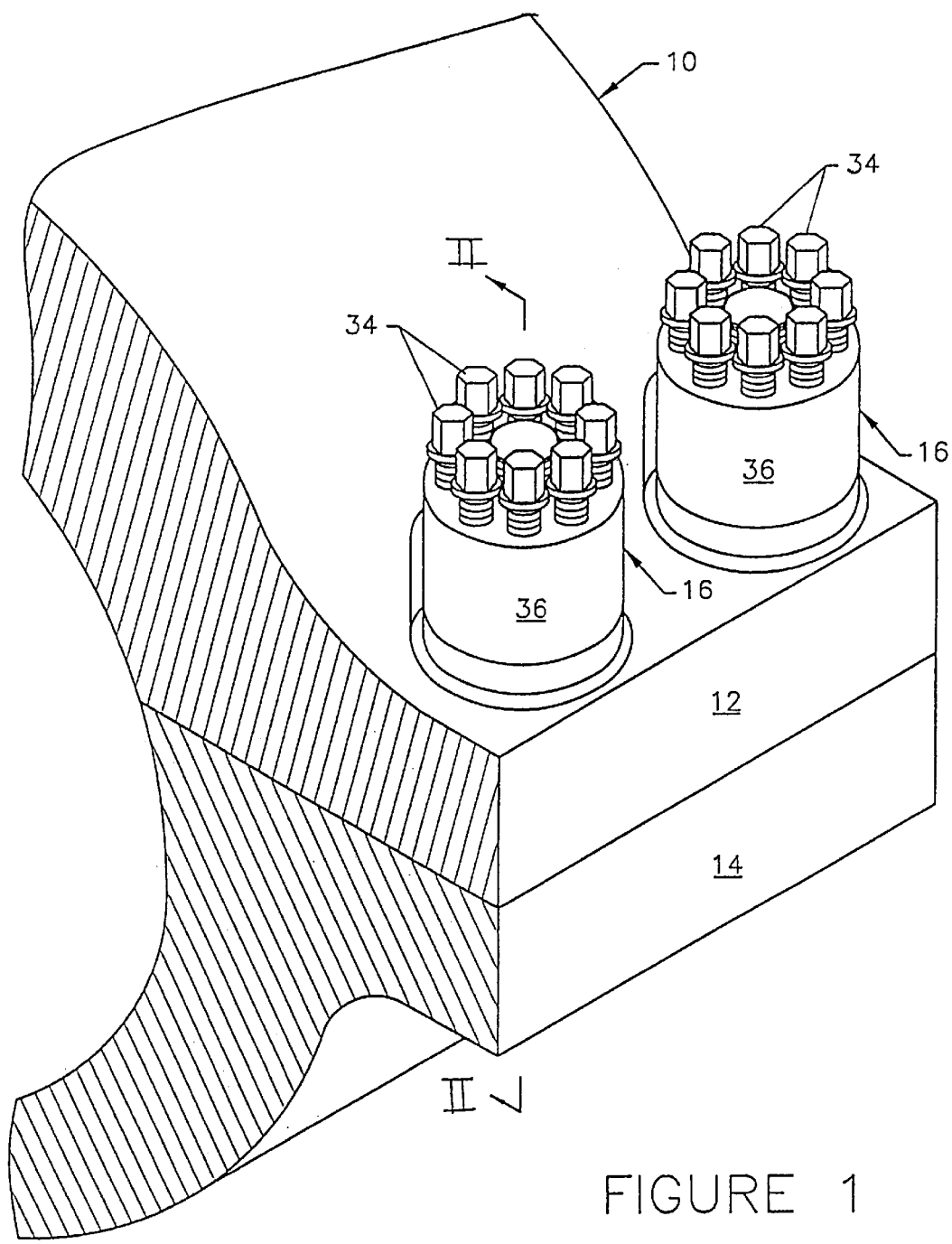
FIG. 1 is a fragmentary isometric view of a turbine casing incorporating the high temperature bolting system according to the present invention.

A portion of a steam turbine 10 is illustrated in FIG. 1 and includes mating flanges 12 and 14, typically made of cast chrome molybdenum vanadium steel. Each flange is of a substantial thickness, typically ranging from 2 inches to 12 inches or more depending on the site about the periphery of the steam turbine. As set forth hereinbefore the coefficient of thermal expansion produces an expansion of the 10 inch flange of 0.073 inches. Side by side fastening systems 16 are provided to bolt the flanges together under a clamping force that is sufficiently great so that the required clamping force remains operative throughout a temperature range from ambient temperature to an operating temperature of between 800° F. and 1200° F.

According to the various embodiments of the present invention, a stud or threaded bolt made from Inconel 718 or another super alloy with an expansion coefficient similar to the housing material, is selected to clamp the chrome molybdenum vanadium mating flanges of the steam turbine 10. In the embodiment illustrated in FIG. 2, the fastening system 16 includes a stud 18 having an elongated fastener shank 20 with threaded portions 22 and 24 at opposite ends of the shank. The shank is stepped, identified by reference numeral 23, to provide a reduced diameter along the length thereof as compared to the pitch diameter of the threads in threaded portion 24. The stepped configuration allows a large shear area where the stud is threadedly engaged with internal threads 26 in flange 14. Because the material of the flange is relatively soft the large shear area prevents stripping of the threads. Mating engagement between threads 24 and 26 form a connector at one end of the fastener shank and at the opposite end of the fastener shank a stress generating flange 28 is in mating engagement with threads 22 of the fastener shank.

The reduced diameter of the fastener shank 20 provides a larger footprint for seating engagement with a hardened washer 30, as compared with the footprint of the original larger diameter stud washer. The enlarged footprint is necessary to distribute the clamping force to a greater support area of the flange 12. The large foot print is achieved by enabling a smaller inside diameter and a larger outside diameter for the washer 30. The outside diameter of washers for high temperature bolting systems should be as large as the space permits. A gain of 1/16 inch or more can substantially reduce stresses under the washer. Another benefit provided by the reduced diameter of the fastener shank is, that at the same tightening force a higher stress in the stud 18 is produced thereby providing more elongation and more elasticity. The increased elasticity provides more resiliency to elastically withstand the thermally generated stresses. The chrome molybdenum vanadium steel has a coefficient of thermal expansion of $8.0^{-6}$ inch/° F./inch which is sufficiently similar to the coefficient of thermal expansion of $8.0^{-6}$ inch/° F./inch for the Inconel 718 forming the fastener shank 20 to provide the features and advantages of the present invention. As will now be apparent to one skilled in the art, the cast steel material of the flanges 12 and 14 have a creep strength at an operating temperature of 1000° F. of 10,000 psi and are protected against elastic deformation given that the bolting shank material has a comparable creep strength, Inconel 718, of at least 100,000 psi at 1000° F. As can be seen, the creep strength ratio is 10:1 although the ratio can range from 4:1 to greater than 10:1 particularly with the development of special purpose alloys. Thus, the alloy Inconel 718 can withstand a mechanical stress of at least 108,000 psi at 1000° F. and can easily withstand the higher stresses without risking plastic deformation.

Because of the extreme stress represented by the clamping force, it is difficult to loosen the stress generated flange after heating when all lubricants have evaporated. To reduce loosening torque it is preferred to relieve at least some of the stress by a thermally induced elongation produced by introducing a low cost cartridge heater into the internal body of the shank through a hole 32 drilled into the center of the stud. The heating element will be necessary only in severe instances to facilitate loosening a tight stress generated flange. Timely lubrication of the threads at the stress generating flange and quick heating of the stud 18 through the center hole 32 will lower the required break loose torque.

Figure 2:
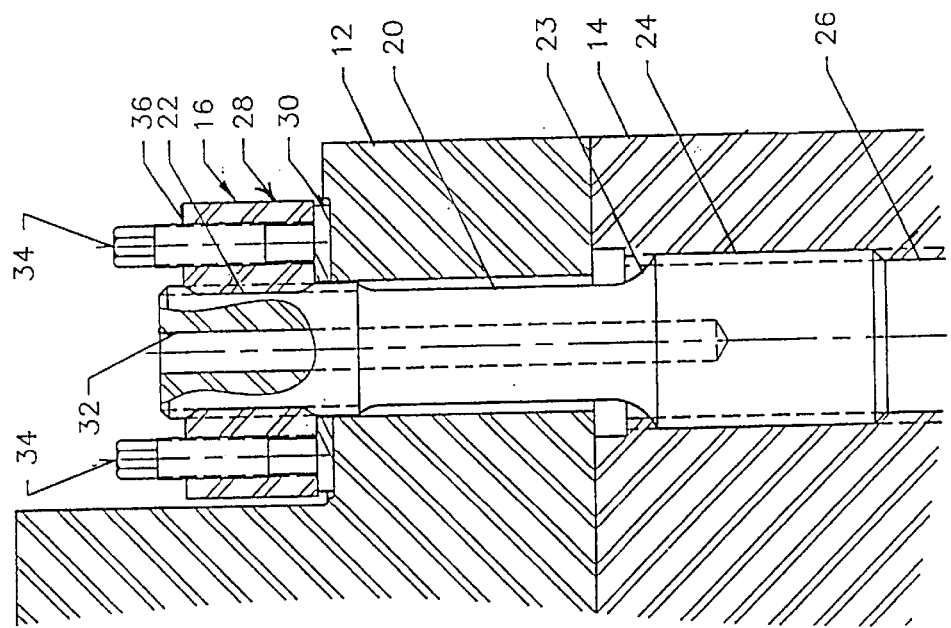
FIG. 2 is a sectional view taken along lines II—II of FIG. 1.

The stress generating flange 28 is preferably in the form of a multi-jackbolt tensioner which forms an important part of the preferred embodiment of the high temperature bolting system of the present invention. The stress generating flange is of the general type disclosed in United States Pat. No. RE. 33,490. As shown in FIGS. 1 and 2, a plurality of jack bolts are threadedly engaged in tapped holes at spaced apart locations about the outer periphery of a tensioner body 36. Preferably, as shown, the tensioner body 36 takes the form of a circular ring. This form of a tensioner body provides increased strength without increasing the outside diameter from that of the outside diameter of a standard hexagon shaped nut. An important concept of the present invention is to increase the load bearing area by which the washer 30 transmits a compressive force to the flange 12. The present invention takes advantage of the property of the casting material used in turbines and similar high temperature applications which is 40% stronger in compression than tension. The elongated fastener shank comprised of a nickel based super alloy is constructed with a reduced diameter as compared with a conventional shank diameter to allow more stretch to the shank under the varying load conditions imposed by the thermal expansion. With superalloy fasteners the shank always operates within the elastic limits of the material and maintains the desired clamping pressure. By reducing the diameter of the shank, the threaded portion 22 is correspondingly reduced so that the inside diameter of washer 30 is reduced thus increasing the area of the load bearing face of the washer in contact with flange 12. This relationship allows the same pounds per square foot loading by the washer 30 but a much larger load can be transferred because of the increased area of the load bearing face of the washer.

The following example demonstrates this benefit of the present invention. A 2 inches nominal diameter bolt shank will be used with a washer having a 2 inches inside diameter and a 3 inches outside diameter thereby defining a load bearing face area of 3.9 sq. inches. The fastener of the present invention can be provided with a shank having a diameter of 1.5 inches whereby the inside diameter of the washer can be nominally 1.5 inches and the outside diameter 3 inches. This provides a load bearing area of 5.3 sq. inches. To transfer the loads from the jack bolt without upsetting the material of the washer, the washer is made from a super alloy such as Inconel 718, A 286 or other high temperature nickel based super alloys. Because of the relatively small washer thickness, the thermal expansion coefficient of the washer material does not materially affect the bolting system. The tensioner body is significantly strengthened to withstand the increased clamping pressure because the threaded end portion 22 of the tensioner has a smaller diameter allowing a larger, stronger tensioner body 36 with larger diameter tapped holes for the jackbolts 34. One suitable material for the nut body is 316 stainless steel (ASTM A194-8M) to provide sufficient strength at the high operating temperatures. Jackbolts are made from super alloys, Inconel 718, is a preferred jackbolt material, because it can be used with the nut body made from 316 stainless steel to prevent seizure and galling of the jackbolts in the tensioner body 36 under load. The relatively high thermal expansion coefficient of the tensioner body 36 as compared to the expansion coefficient of the fastener shank 20 is of little consequence since the nut body is relatively short in length and will expand only to a small relative extent. The treaded portion 24 is formed with an enlarged diameter as compared to the diameter of the fastener shank 20 and threaded portion 22 to provide a necessary increase to load transfer area formed by the threaded connection with the internal threads in flange 14. In the example discussed previously involving the use of a nominal 1½ inches diameter Inconel fastener, the shank material will have a strength factor of between 8 to 10 times greater than the strength of the material of flange 14.

To demonstrate the advantage of utilizing the 40% greater strength of most metals in compression as compared with tension, the load bearing area of a standard high temperature washer (3" O.D. 2" I.D.) for a 2" bolt is 3.39 sq. in. The area of a standard high temperature 2" bolt (minor diameter 1.84") is 2.65 sq. in. The ratio of the area of the washer to the area of the bolt is 1.48. This ratio remains constant for all standard high temperature washer and bolt combinations. According to the present invention, the load bearing area of a washer (3" O.D. 1.5 I.D.) is 5.3 sq. in. The area of the super alloy bolt (minor diameter 1.34") is 1.4 sq. in. In the bolting system of the present invention, the ratio of the area of the washer to the area of the bolt is 3.79. This ratio will not change significantly for all new high temperature washer and bolt combinations according to the present invention. The use of nickel based super alloy for the bolting material enables the tremendous increase to the ratio which as can be seen provides the great benefit of an increase to the area for the transfer of load in compression and thereby maintain the loading per square inch by the washer within elastic limits of the metal in compression. In the standard high temperature bolting system, the minor area of the bolt in tension was the limiting factor as to the strength of the bolting system. In the new high temperature bolting system, the area under the washer which is larger than the minor area of the bolt in tension becomes the limiting factor. The new limiting factor is increased not only because of the significant increase to the washer area but also because the compressive load transfer has the advantage of a 40% greater capacity than load transfer in tension. In the example of a standard high temperature 2 inch bolt, a minor bolt area of 2.65 sq. in. with a creep strength of 7000 psi results in a load bearing capacity of: 2.65 sq. in.×7000 psi=18,555 lbs. The new bolting system the area under the washer is 5.3 sq. in. with a creep strength of 7000 psi and the benefit of a compression factor of 1.4 results in a load bearing capacity: 5.3 sq. in.×7000 psi×1.4=51,940 lbs. The significant increase is really achieved by the improved bolting system of the present invention.

Figure 3:
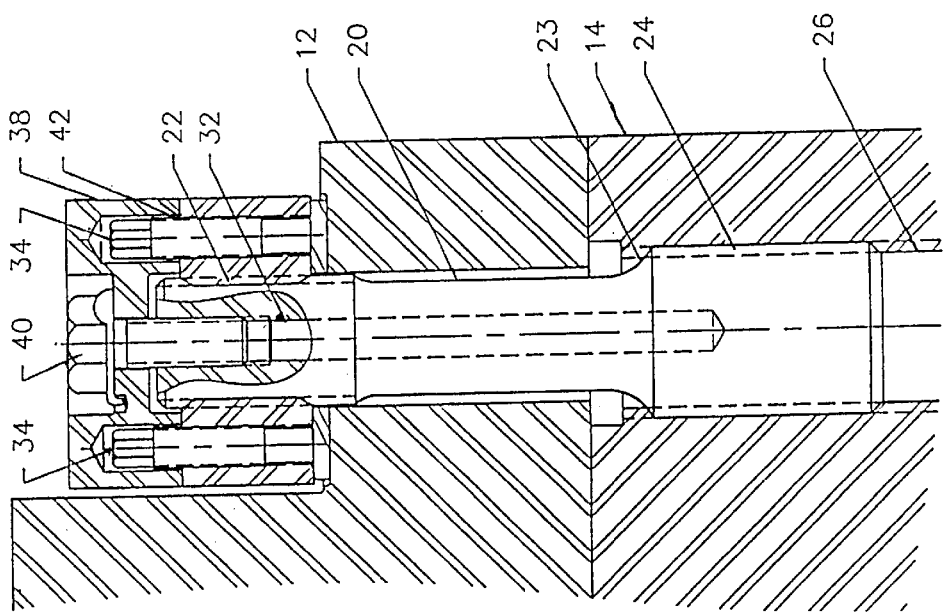
FIG. 3 is a sectional view similar to FIG. 2 and illustrating a further embodiment of the present invention.

Many steam turbines have two casings, an inner casing and an outer casing. The inner casing and the bolting for the inner casing are exposed to live steam. As shown in FIG. 3, to protect the exposed torque receiving ends of the jackbolts 34, a heavy metal cap 38 is attached to the stud 18 when the stud is a discrete member or when the stud is integral with the tensioner body 36. The cap 38 has a central aperture to allow the threaded portion of a bolt 40 to pass through the cap and into a threaded hole in the end portion of the fastener shank. Discrete cavities 42 are formed in the cap to protectively house the exposed end portions of each of the jackbolts 34. An annular cavity in the cap 38 can be used in place of the discrete cavities to protect the jackbolts. In this way the multi-jackbolt tensioners are protected from contact with live steam. Attaching the cap to a stud is relatively easy on super alloy studs when the stud is drilled to form the heater hole 32. It is only necessary to tap the top of the heater hole to receive the threads of a bolt 40. A lock washer 44 is preferably provided to secure the bolt against unwanted release from tapped hole. In the embodiment of FIG. 3, the remaining parts and relationship between the parts are the same as described in regard to FIG. 2.

Figure 4:
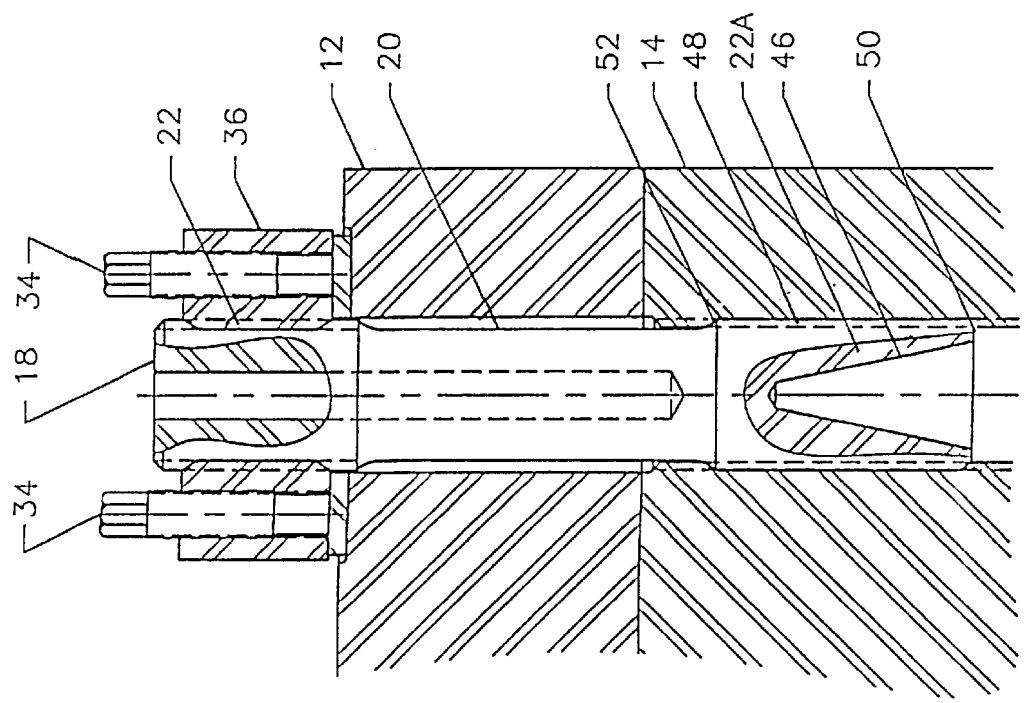
FIG. 4 is a sectional view similar to FIG. 2 and illustrating a further embodiment of the present invention.

The high strength of the nut body 36 is advantageously utilized by converting the large diameter threaded portion 24 to an extended length with a nominal diameter which can be substantially the same as the diameter of the shank 20. As shown in FIG. 4, the threaded portion 22A is constructed with an internal cavity defined by a truncated conical wall 46 which serves as an elastic element to evenly distribute thread forces along the length of the threaded portion 22A up to the extreme operating temperatures. A tapered thread over the length of the threaded portion 22A creates a differential thread pitch to the threads 48. The effect produced by the differential thread pitch moves stress concentrations in the threads 48 to the terminal end portion 50 toward the tensioner body from a site 52 which is close to the origin of the fastener shank 20. The creation of the differential thread pitch distributes the load imposed by the stress generating flange 28 more evenly along the extended length of the threads 48 and thereby avoid over stressing of the threads within a small area.

Figure 5:
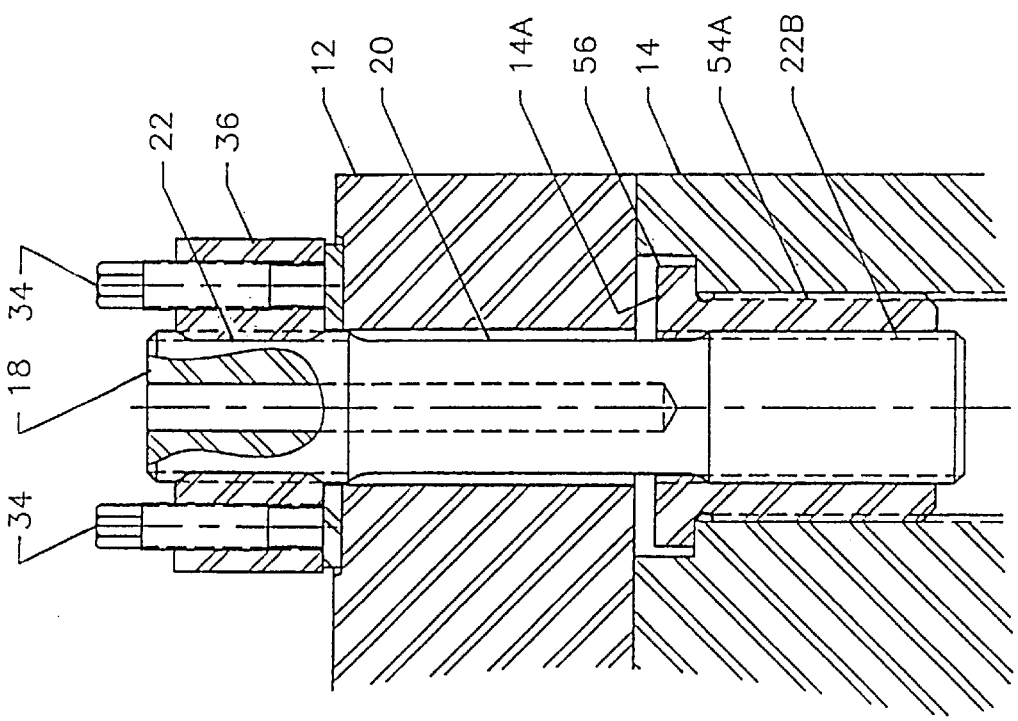
FIG. 5 is an illustration similar to FIG. 2 of a further embodiment of the present invention particularly useful for providing fasteners to existing turbine casings.

Another embodiment of the present invention is illustrated in FIG. 5 and provides a threaded bushing 54 which due to its large outside diameter is used to distribute the forces generated by the stress generating flange safely to the flange 14 without the danger of damage to the threaded connections. The bushing 54 is preferably formed from the same material as the nut body, namely, stainless steel and thereby act in unison with the nut body to maintain the clamping force generated by the fastener on the mating flanges 12 and 14. As can be seen in FIG. 5, the diameter of the threaded portion 22B extending from the fastener shank 20 is approximately the same as in the example given above the nominal diameter of the threads may be 1½ inches. The external threads 54A on the bushing 54 terminate at a relief area where a shoulder 56 is provided to abut against a counterbore seat 14A in flange 14.

Figure 6:
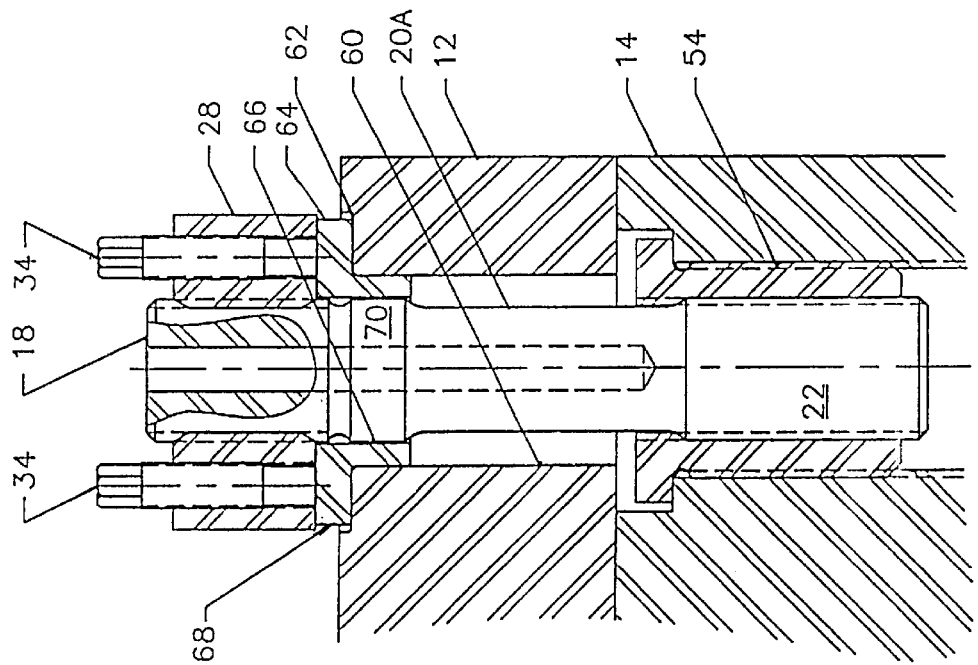
FIG. 6 is a view similar to FIG. 5 and illustrating a further embodiment of a fastener for existing turbine casings.
Figure 7:
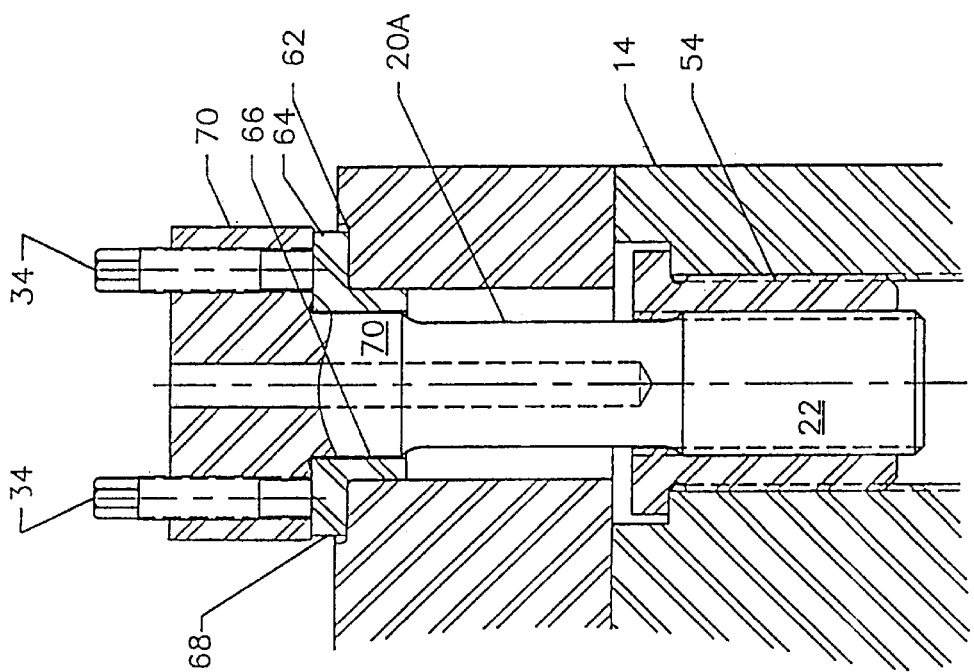
FIG. 7 is a view similar to FIG. 5 and illustrating a further embodiment of a fastener for existing turbine casings.

The present invention also allows retro-fitting the bolting systems for the casing of existing steam turbines. Retrofitting has presented challenging engineering problems because of the extreme temperature excursions and the existing dimensional limitations imposed by the existing design of the flanges of the casting. The flange of the top casing usually has a relatively large diameter hole to allow free passage of a stud threadedly engaged in the tap hole of the flange of the bottom casing. According to the present invention, the large diameter stud is replaced by a much smaller diameter super alloy stud and as shown in FIGS. 6 and 7, a relatively large annular gap is formed between external diameter of the fastener shank 20A and the annular surface 60 defining the opening in flange 12. Because of this relationship between the diameter of the fastener shank and the diameter of the hole in which the shank resides, a relatively small area is defined by a machined surface 62 in the exposed face of the flange to support the load transferred by the stress generating flange 28. If a flat washer is used to transfer the stresses generated by the jackbolts, the danger of deformation of the hot and rather soft housing metal is great and will likely occur. To enable transfer of the necessary forces generated by the stress by the fastener, a flanged support ring 64 is interposed between the stress generating flange 28 and the surface 62. The ring 64 has the form of a circular ring portion 66 with an external annular flange 68 protruding from the circular ring portion. As shown, the annular flange 68 extends between flange 12 and the nut body 28 and serves to transfer the load from the jackbolts to the flange 12. The annular flange 68 is constructed to tightly fit along a length of the annular opening 60 adjacent the machine surface 62. The flange supplies the needed back-up support for the metal of flange 12.

The backup support provided by this arrangement of parts serves to prevent the annular wall 60 of the housing from collapsing under the stress. The metal under the annular flange 68 is confined in the same manner that a hydraulic fluid is confined in a piston and cylinder assembly. The confined metal of the flange thereby provides a greater load bearing capacity than could be sustained if the metal was not confined. The flanged spacer is preferably made from a super alloy such as Inconel 718 to avoid possible destruction of the spacer under the forces imposed transverse to the elongated length of the fastener shank and the clamping force generated by the stress generating flange 28. It will be observed that the bolting arrangement in FIGS. 6 and 7 provided the reduced diameter for the shank portion 20A made of the superalloy metal as discussed hereinbefore to provide an increase to the area along the top surface of the flange 64 which receives the load from the jackbolts. In both FIGS. 6 and 7, the embodiments of the present invention provide for the use of threaded bushing 54 to enable the safe distribution of the clamping force from the stress generating flange 28 to the flanges 14. The embodiments of FIGS. 6 and 7 differ in that in FIG. 6 the stress generating flange 28 is discrete from the fastener shank 20A In FIG. 7, the stress generating flange is identified by reference numeral 70 and is an integral part of the fastener shank 20A.

Figure 8:
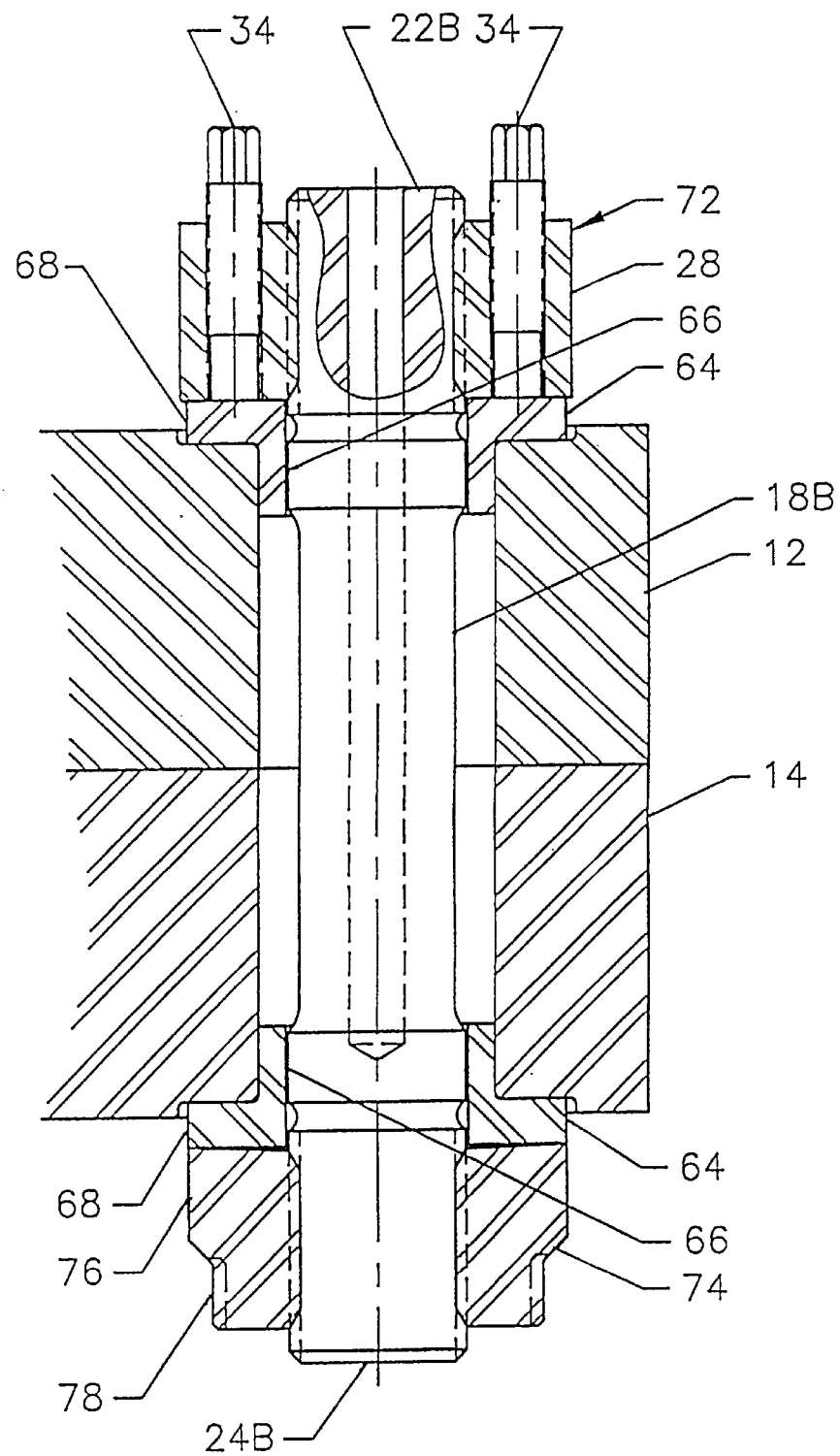
FIG. 8 is a view similar to FIG. 5 and illustrating a thru-bolt system according to the present invention.

A stud and nut as explained above, can be replaced by a through-bolt system reference numeral 72. As shown in FIG. 8, the exposed sides of the housing flanges 12 and 14 receive the same compressive loading by the stress generating flanges 28 threadedly engaged with threaded end portion 22B of stud 18B and a threaded nut 74 threadedly engaged with threaded end portion 24B. To create the largest possible footprint for the opposing nut 72 a flanged support ring 64 is provided between each of the flanges 12 and 14 and flange 28 and nut 74, respectively to prevent crushing of the relatively soft metal used to form the housing flanges. It is suitable to use a flexible nut design according to the disclosure by U.S. Pat. No. 4,846,614, which disclosure is incorporated by this reference thereto, to transfer the forces generated to a flange generated by the tensioner body 36 to the other flange. Essentially, the threaded nut 74 is constructed with an enlarged bottom portion 76 where contact with the flanged support ring 64 and a nut end portion 78 with a reduced diameter as compared to the diameter of portion 76. The nut end portion 78 because of its reduced diameter can flex toward the internal threads in the nut. The load bearing face of the bottom portion 76 is provided with a relief area adjacent the internal threads whereby portions 78 flexes outwardly under load. The inward flexing of portion 76 and outward flexing of portion 78 mechanically creates a differential thread pitch through the nut causing an increase to load bearing contact in the threaded connection with the nut. The flanged support rings 64 function in the same manner as described hereinbefore. The thru-bolt system 72 is also useful for clamping flanges of a steam turbine having bolt hole openings of reduced diameter to closely match with only a small clearance to allow installing of stud bolts. In this circumstance, flat washers 30 will replace the flange of support ring 64 to allow distribution of the compressive force over a sufficiently great area and allow high temperature operation within the elastic limit of the metal of flanges 12 and 14.

While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

I claim:

1. A bolting apparatus for maintaining a clamping force between bolted parts while operating at a temperature of 800° F. to 1200° F., said apparatus including the combination of:

an elongated fastener shank having a coefficient of thermal expansion similar to a coefficient of thermal expansion of such bolted parts for minimizing differential dimensional changes due to temperature variations, said elongated shank having an elastic limit at high temperature sufficiently great to maintain clamping force between such bolted parts throughout a temperature range from ambient temperature to an operating temperature of between 800 degrees F. to 1200 degrees F., said fastener shank having a creep strength several times greater than the creep strength of such bolted parts at said operating temperature;

a connector at one end of said elongated fastener shank for mechanically joining with one of such bolted parts;

a stress generating flange connected to an end portion of said elongated fastener shank which is opposite the end having said connector for tensioning said elongated fastener shank; and a load transfer member for transferring said tensioning from the stress generating flange to one of such bolted parts.

2. The apparatus according to claim 1 wherein said connector includes a threaded end portion on said shank threadedly engaged with one of said bolted parts, and wherein said shank includes a large shear area for preventing stripping of the treads of said threaded end portion.

3. The apparatus according to claim 1 wherein said connector includes a threaded heat resistant large diameter bushing threadedly interconnecting said elongated threaded shank and one of such bolted parts for preventing stripping of the treads of said bolted part.

4. The apparatus according to claim 3 wherein said threaded heat resistant bushing defines a coefficient of thermal expansion greater than the coefficient of thermal expansion of both of said fastener shank and such bolted parts for providing a differential thread pitch to the threaded connection between said threaded heat resistant bushing and said elongated fastener shank at said operating temperature whereby stress concentrations shift along said threaded heat resistant bushing from a site proximate a line of separation between such bolted parts to a site most remote thereto containing a terminal end of said threaded heat resistant bushing.

5. The apparatus according to claim 3 wherein said threaded heat resistant bushing defines an internal thread pitch diameter substantially corresponding to the diameter of said elongated fastener shank.

6. The apparatus according to claim 1 further includes a plurality of jack bolts in threaded holes at spaced-apart locations about an outer peripheral of said stress generating flange, said jack bolts separately receiving torque to stress said elongated fastener shank between said connector and said stress generating flange through torquing said jack bolts.

7. The apparatus according to claim 6 further including a cap having at least one cavity for receiving portions of said plurality of jack bolts protruding from said elongated fastener flange, and a fastener for securing said cap to said elongated fastener flange.

8. The apparatus according to claim 6 further including a hardened washer in a force transmitting relation between one of such bolted parts and end portions of said plurality of jack bolts protruding from said stress generating flange.

9. The apparatus according to claim 6 wherein said stress generating flange includes a circular ring having a threaded central opening for threaded engagement with threads on an end portion of said elongated fastener shank.

10. The apparatus according to claim 6 further including a spacer having a circular ring portion with an annular flange protruding from a side face of the circular ring portion, the annular flange extending between an aperture in one of said bolted parts and close to said elongated fastener shank for supporting the aperture wall in the bolted part while the circular ring portion is in a force transmitting relation between the bolted part having the aperture and end portions of said plurality of jack bolts protruding from said stress generating flange.

11. The apparatus according to claim 10 wherein said elongated fastener shank includes an annular load bearing face in load transmitting contact with an annular opening in said circular ring portion for preventing deformation of said aperture wall in the bolted part.

12. The apparatus according to claim 11 wherein said annular load bearing face is defined by a diameter greater than the diameter of a remaining portion of said elongated fastener or shank extending to the second of such bolted parts.

13. The apparatus according to claim 12 wherein said stress generating flange includes a circular ring having a threaded central opening for threaded engagement with threads on an end portion of said elongated fastener shank.

14. The apparatus according to claim 12 wherein said stress generating flange is integral with said elongated fastener shank.

15. The apparatus according to claim 9 wherein said circular ring has a coefficient of thermal expansion greater than the coefficient of expansion of said fastener shank and such bolted parts for providing a differential thread pitch to the threaded connection between said circular ring and said fastener shank at said operating temperature whereby stress concentrations shift along said circular ring from a site proximate such bolted parts to a site most remote thereto.

16. The apparatus according to claim 1 wherein said connector includes a threaded interconnection between said elongated threaded shank and one of such bolted parts, and wherein said connector further includes tapered thread having maximum diameter at the terminal end portion of said connector for providing a differential thread pitch to the threaded connection between said elongated fastener shank and said one of such bolted parts at said operating temperature whereby stress concentrations shift along said connector from a site proximate such bolted parts to a site of said maximum diameter of the tapered thread wall most remote thereto.

17. The apparatus according to claim 1 wherein said connector includes a threaded interconnection between said elongated threaded shank and one of such bolted parts, and wherein said connector further includes a truncated conical wall forming a hollow cavity having maximum diameter at the terminal end portion of said connector for increasing the elasticity to the threaded connection between said elongated fastener shank and said one of such bolted parts at said operating temperature whereby stress concentrations shift along said connector from a site proximate such bolted parts to a site of said maximum diameter of the truncated conical wall most remote thereto.

18. The apparatus according to claim 1 further including a spacer having a circular ring portion with an annular flange protruding from a side face of the circular ring portion, the annular flange extending between an aperture in one of said bolted parts and said elongated fastener shank for supporting the aperture wall in the bolted part while the circular ring portion is in a force transmitting relation between the bolted part having the aperture and said stress generating flange.

19. The apparatus according to claim 1 further including cavity walls extending along an internal length of said elongated fastener shank suitable for receiving a heater element for imparting thermal elongation to said elongated shank and relieving stress between said connector and said stress generating flange.

20. The apparatus according to claim 1 wherein said connector includes a nut member threadedly engaged with said elongated fastener shank.

21. The apparatus according to claim 20 wherein said nut member includes an enlarged bottom portion for contact with said load transfer member and a nut end portion of reduced diameter as compared with the diameter of said enlarged bottom portion.

22. The apparatus according to claim 20 further including a second spacer having a circular ring portion with an annular flange protruding from a side face of the circular ring portion, the annular flange extending between an aperture a second of said bolted parts and said elongated fastener shank for supporting the aperture wall in the bolted part while the circular ring portion is in a force transmitting relation between the bolted part having the aperture and said nut member generating flange.

* * * * *